US012769865B2

(12) United States Patent
Levi et al.

(10) Patent No.: US 12,769,865 B2
(45) Date of Patent: Oct. 20, 2026

(54) CONTROLLING ACCESS TO INTERNAL KNOWLEDGE IN A LANGUAGE MODEL

(71) Applicant: INTERNATIONAL BUSINESS MACHINES CORPORATION, Armonk, NY (US)

(72) Inventors: Matan Levi, Tel Aviv (IL); Yair Allouche, Dvira (IL); Aviv Ron, Klachim (IL); Srinivas Babu Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 19/062,206

(22) Filed: Feb. 25, 2025

(65) Prior Publication Data

US 2026/0252721 A1 Aug. 27, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
USPC ........................................................... 726/28
See application file for complete search history.

(56) References Cited

U.S. PATENT DOCUMENTS 11,455,357 B2 * 9/2022 Tiwari ................ G06F 16/9535
12,254,029 B1 * 3/2025 Veillon ................. G06F 16/243
12,407,543 B2 * 9/2025 Mishelevich ......... H04L 12/283
12,561,353 B1 * 2/2026 Donlan ............. G06F 16/33295
12,579,174 B1 * 3/2026 Jedema ............... G06F 16/3329
2022/0318675 A1 10/2022 Sawaf et al.
2023/0107409 A1 4/2023 Jenatton et al.
2023/0259705 A1 8/2023 Tunstall-Pedoe et al.
2024/0256582 A1 8/2024 Jain et al.
2024/0265041 A1 * 8/2024 Rennie ................ G06F 16/2423
(Continued)

FOREIGN PATENT DOCUMENTS

CN 118296654 A 7/2024
CN 118626603 A 9/2024
(Continued)

OTHER PUBLICATIONS

Achiam et al. "GPT-4 technical report", arXiv:2303.08774v6 [cs. CL], Mar. 4, 2024, 100 pages.
(Continued)

*Primary Examiner* — Amare F Tabor
(74) *Attorney, Agent, or Firm* — Harrity & Harrity, LLP

(57) ABSTRACT

An approach is provided for controlling access to internal knowledge in a language model (LM). Data from one or more of data sources on which the LM is trained is stored in a vector store. Data segments in the stored data are tagged to indicate origin data sources. A user prompt is received for an information retrieval system that uses the LM to generate answers to user prompts. The user prompt is provided by a user having a document access privilege. Documents are retrieved from the vector store by using the user prompt, an answer to the user prompt, or a combination of the user prompt and the answer. Access requirements for the retrieved documents are identified based on the tagged data segments. Based on the retrieved documents, the identified access requirements, and the privilege, it is determined whether to present the answer to the user.

20 Claims, 3 Drawing Sheets

(56) References Cited

U.S. PATENT DOCUMENTS

| | | | | |
|---|---|---|---|---|
| 2024/0385832 | A1* | 11/2024 | Nyswonger | G06F 8/00 |
| 2025/0005288 | A1* | 1/2025 | Amatriain-Rubio | G06F 40/216 |
| 2025/0173330 | A1* | 5/2025 | Durg | G06F 16/243 |

FOREIGN PATENT DOCUMENTS

| | | | |
|---|---|---|---|
| CN | 118786434 | A | 10/2024 |
| CN | 118798258 | A | 10/2024 |
| CN | 118886039 | A | 11/2024 |
| CN | 119149700 | A | 12/2024 |
| DE | 102024004449 | A1 | 2/2025 |
| WO | 2024/130222 | A1 | 6/2024 |

OTHER PUBLICATIONS

Allouche, et al., "Controlling Access to Internal Knowledge in a Language Model Using a Mixture of Experts Tuning", U.S. Appl. No. 19/062,250, filed Feb. 25, 2025, 35 pages.
Anil et al. "PaLM 2 Technical Report", arXiv:2305.10403v3 [cs.CL], Sep. 13, 2023, 93 pages.
Authors et al. Disclosed Without Attribution. "System and Method of Monitoring Information Processing Based on the Origin of the Data Involved", IP.com No. IPCOM000270145D, Jun. 7, 2022, 5 pages.
Authors et al.: Disclosed Without Attribution. "Method and System for Protecting Sensitive Data in Large Language Models using Differential Privacy", IP.com No. IPCOM000274071D, Mar. 27, 2024, 8 pages.
Dinan et al. "Build it break it fix it for dialogue safety: Robustness from adversarial human attack", ACL Anthology, https://aclanthology.org/D19-1461, Nov. 2019, pp. 4537-4546.
Gudibande et al. "The False Promise of Imitating Proprietary LLMs", https://arxiv.org/pdf/2305.15717.pdf, May 25, 2023, 15 pages.
Huang et al. "A Survey of Safety and Trustworthiness of Large Language Models through the Lens of Verification and Validation", arXiv:2305.11391v2 [cs.AI], Aug. 27, 2023, 69 pages.
Kanagaraj Amar. "Role-Based Access Control for LLM Sensitive Data", retrieved from web https://www.protecto.ai/blog/role-based-access-for-sensitive-data-in-llms, Aug. 4, 2023, 9 pages.
Namer et al. "Tenant Data Security for LLM Applications in a Multi-Tenancy Environment, Technical Disclosure Commons", https://www.tdcommons.org/cgi/viewcontent.cgi?article=7721&context=dpubs_series, Jan. 12, 2024, 9 pages.
Ouyang et al. "Training language models to follow instructions with human feedback", https://arxiv.org/pdf/2203.02155, Mar. 4, 2022, 68 pages.
Ouyang et al. "Training language models to follow instructions with human feedback", retrieved from web https://openreview.net/pdf?id=TG8KACxEON, 2022, 15 pages.
Özgür et al. "A Simple Architecture for Enterprise Large Language Model Applications based on Role based security and Clearance Levels using Retrieval-Augmented Generation or Mixture of Experts", https://www.arxiv.org/abs/2407.06718, Jul. 9, 2024, 13 pages.
Park et al. "AI Deception: A Survey of Examples, Risks, and Potential Solutions", arXiv:2308.14752v1 [cs.CY], Aug. 28, 2023, 30 pages.
Röttger et al. "XSTest: A Test Suite for Identifying Exaggerated Safety Behaviours in Large Language Models", arXiv:2308.01263v3 [cs.CL], Apr. 1, 2024, 24 pages.
Schlarmann et al. "On the Adversarial Robustness of Multi-Modal Foundation Models", https://arxiv.org/abs/2308.10741, Aug. 21, 2023, 9 pages.
Sharma Vishal. "SearchUnifyFRAG™: Optimizing Large Language Models (LLMs) for Context-aware and Personalized Support Experiences", retrieved from web https://www.searchunify.com/blog/searchunifyfragtm-optimizing-large-language-models-llms-for-context-aware-and-personalized-support-experiences/, Sep. 18, 2023, 8 pages.
Shelby et al. "Sociotechnical Harms of Algorithmic Systems: Scoping a Taxonomy for Harm Reduction", arXiv:2210.05791v3 [cs.HC], Jul. 19, 2023, 19 pages.
Singh Shridhar. "Enhancing Privacy and Security in Large-Language Models: A Zero-Knowledge Proof Approach", retrieved from web https://orcid.org/0009-0005-3534-7148, Mar. 21, 2024, 9 pages.
Touvron et al. "Llama 2: Open Foundation and Fine-Tuned Chat Models", https://arxiv.org/abs/2307.09288, Jul. 18, 2023, 76 pages.
Vishwakarma Sandeep. "Pentesting Large Language Model Applications and AI Decoy Bypass", InfoSec Write-ups, https://infosecwriteups.com/pentesting-large-language-model-applications-and-ai-decoy-bypass-140e1f50db3c, Jul. 30, 2024, 16 pages.
Yan et al. "On Protecting the Data Privacy of Large Language Models (LLMs): A Survey", arXiv:2403.05156v2 [cs.CR], Mar. 14, 2024, 18 pages.
Zhu et al. "Uni-Perceiver-MoE: Learning Sparse Generalist Models with Conditional MoEs", arXiv:2206.04674v2 [cs.CV], Jul. 5, 2022, 19 pages.
Zou et al. "Universal and Transferable Adversarial Attacks on Aligned Language Models", arXiv:2307.15043v2 [cs.CL], Dec. 20, 2023, 31 pages.
International Searching Authority, "Notification of Transmittal of the International Search Report and the Written Opinion of the International Searching Authority, or Declaration," Patent Cooperation Treaty Jun. 25, 2026, 6 pages, International Application No. PCT/IB2026/050787.
International Searching Authority, "Notification of Transmittal of the International Search Report and the Written Opinion of the International Searching Authority, or Declaration," Patent Cooperation Treaty Jun. 24, 2026, 7 pages, International Application No. PCT/IB2026/050789.

* cited by examiner

CONTROLLING ACCESS TO INTERNAL KNOWLEDGE IN A LANGUAGE MODEL

BACKGROUND

The present invention relates to information retrieval, and more particularly to managing access control for model-based information retrieval.

SUMMARY

In one embodiment, the present invention provides a computer-implemented method. The method includes training a language model (LM) on multiple data sources having multiple access requirements. The method further includes storing data from one or more of the multiple data sources in a vector store. The method further includes tagging data segments in the stored data in the vector store so that a given data segment indicates a data source from which the given data segment originates. The method further includes receiving a user prompt for an information retrieval system that uses the LM to generate answers to user prompts. The user prompt is provided by a user having a privilege for document access. The method further includes retrieving documents from the vector store by using the user prompt, an answer to the user prompt, or a combination of the user prompt and the answer. The method further includes identifying respective access requirements for the retrieved documents based on the tagged data segments. The method further includes, based on the retrieved documents, the identified access requirements, and the privilege, determining whether to present the answer to the user prompt to the user.

A computer system and a computer program product corresponding to the above-summarized computer-implemented method are also described herein.

DETAILED DESCRIPTION

Overview

Figure 1:
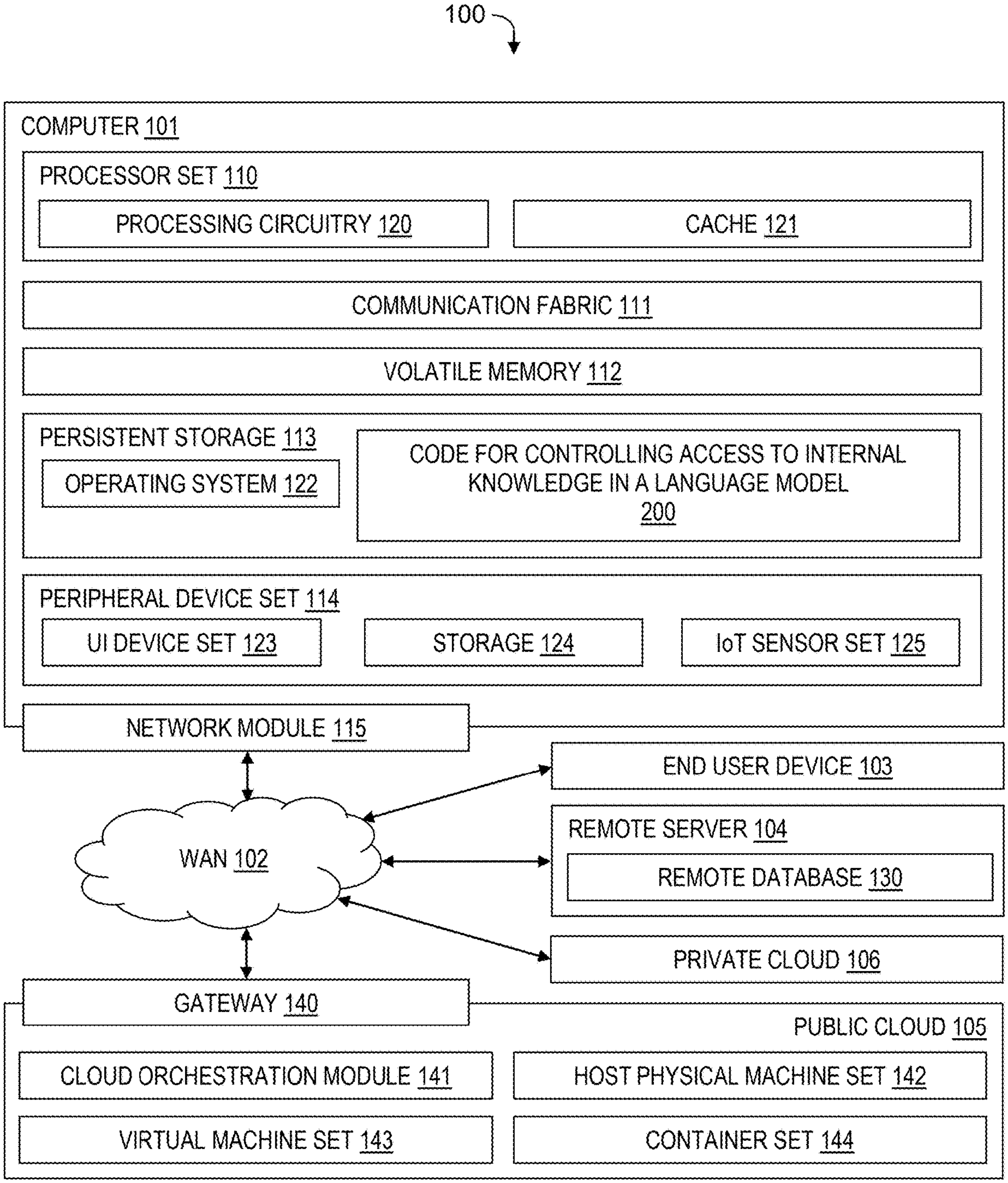
FIG. 1 is a block diagram of a system for controlling access to internal knowledge in a language model, in accordance with embodiments of the present invention.

According to an aspect of the present invention, there is provided a computer-implemented method. The method includes training a language model (LM) on multiple data sources having multiple access requirements. The method further includes storing data from one or more of the multiple data sources in a vector store. The method further includes tagging data segments in the stored data in the vector store so that a given data segment indicates a data source from which the given data segment originates. The method further includes receiving a user prompt for an information retrieval system that uses the LM to generate answers to user prompts. The user prompt is provided by a user having a privilege for document access. The method further includes retrieving documents from the vector store by using the user prompt, an answer to the user prompt, or a combination thereof, and identifying respective access requirements for the retrieved documents based on the tagged data segments. The method further includes, based on the retrieved documents, the identified access requirements, and the privilege, determining whether to present the answer to the user prompt to the user. A general technical effect of the aforementioned aspect of the invention is providing access control on the internal knowledge of a language model. Specific technical effects of the aforementioned determining whether to present the answer to the user prompt to the user based on the retrieved documents, the identified access requirements, and the privilege include enabling the language model to provide user-specific responses based on individual privileges of users and access rights of users, even though the model has been trained on a set of data sources having diverse access requirements.

According to another aspect of the present invention, there is provided a computer system that includes a processor set; one or more computer-readable storage media; and program instructions stored on the one or more computer-readable storage media to cause the processor set to perform the operations discussed above relative to the aspect of the invention that provides the method.

According to another aspect of the present invention, there is provided a computer program product that includes one or more computer-readable storage media and program instructions stored on the one or more computer-readable storage media to perform the operations discussed above relative to the aspect of the invention that provides the method.

The computer system and the computer program product each provide general and specific technical effects that include the general and specific technical effects discussed above relative to the aspect of the invention that provides the computer-implemented method.

In embodiments, the aforementioned computer-implemented method further includes determining that the privilege satisfies the access requirements for the retrieved documents and, based on the privilege satisfying the access requirements for the retrieved documents, presenting to the user the answer to the user prompt. The presentation to the user of the answer to the user prompt based on the privilege satisfying the access requirements for the retrieved documents provides a special technical effect of allowing users who have a privilege to access the retrieved documents to be presented with the model-generated answer to the user prompt, where the answer is based on the retrieved documents. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

In embodiments, the aforementioned computer-implemented method further includes determining that the privilege does not satisfy the access requirements for the retrieved documents and, based on the privilege not satisfying the access requirements for the retrieved documents, preventing a presentation to the user of the answer to the user prompt. The prevention of the presentation to the user of the answer to the user prompt based on the privilege not satisfying the access requirements for the retrieved documents provides a special technical effect of not allowing users who lack a privilege to access the retrieved documents to be presented with the answer to the user prompt, where the answer is based on the retrieved documents, thereby mitigating the risk that the model inadvertently exposes sensitive information to an individual who is not permitted to access the sensitive information. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

In embodiments, the aforementioned computer-implemented method further includes, in response to determining that the privilege does not satisfy the access requirements for the retrieved documents, designating the answer as invalid and initiating an iterative process, which includes providing the LM with the user prompt enriched by one or more prior invalid answers and one or more corresponding descriptions of issues associated with the one or more prior invalid answers; generating, by the LM, a new answer to the user prompt; determining that the new answer addresses the issues; and in response to the determining that the new answer addresses the issues, presenting the new answer to the user. The feature of the iterative process provides a specific technical effect of generating a subsequent answer to the user prompt that is more specific to the privilege of the user than the initial answer generated by the model, where the specificity to the user's privilege allows the user to access and view the subsequent answer, while not allowing the user to view sensitive information included in the initial answer, thereby addressing issues regarding why the user was not permitted to access and view the initial answer. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

In embodiments, the aforementioned computer-implemented method further includes, in response to the determining that the privilege does not satisfy the access requirements for the retrieved documents, designating the answer as invalid and initiating an iterative process, which includes: providing the LM with the user prompt enriched by one or more prior invalid answers and one or more corresponding descriptions of issues associated with the one or more prior invalid answers; generating, by the LM in a current iteration of the iterative process, a new answer to the user prompt; determining that the new answer does not address the issues; determining that a number of iterations in the iterative process up to and including the current iteration equals a maximum iterations limit; and based on the new answer not addressing the issues and the number of iterations equaling the maximum iterations limit, ending the iterative process and sending a default message to the user to notify and explain why the user is not permitted to receive a response to the user prompt. The feature of the iterative process provides a specific technical effect of attempting to generate a subsequent answer to the user prompt that is more specific to the user's privilege than the initial answer generated by the model, and determining a point in the iteration when the attempts to generate the aforementioned answer are stopped, thereby allowing the user to obtain a notification about why the user is not permitted to access and view the answer. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

In embodiments, the aforementioned operation of storing the data in the vector store includes storing in the vector store pre-training data without any fine-tuning data, fine-tuning data without any pre-training data, or both the pre-training data and the fine-tuning data, known by the LM, where the answer to the user prompt is generated by the LM based on the pre-training data without any fine-tuning data, the fine-tuning data without any pre-training data, or both the pre-training and the fine-tuning data stored in the vector store, the aforementioned operation of identifying the access requirements includes identifying a most restrictive access requirement of a document included in the retrieved documents, where the most restrictive access requirement has a level of restrictiveness that equals or exceeds a restrictiveness of any other access requirement of other documents included in the retrieved documents, and the aforementioned operation of determining whether to present the answer to the user is further based on the most restrictive access requirement. The features of storing the pre-training data without any fine-tuning data, the fine-tuning data without any pre-training data, or both the pre-training data and the fine-tuning data known by the LM and determining whether to present the answer to the user based on the most restrictive access requirement provide a special technical effect of making a more robust decision about granting or denying user access to the answer to the user prompt by simplifying the determination of whether to present the answer to the user because the resolution of the privilege of the user is simply based on the document that has been retrieved and does not need to consider any non-retrieved documents. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

In embodiments, the aforementioned operation of storing the data in the vector store includes storing, in the vector store, documents from specified data sources exclusively, where one or more other data sources included in the multiple data sources on which the LM is trained are open data sources that are not specified data sources, and the aforementioned operation of determining whether to present the answer to the user includes: determining a measure of relevancy of the retrieved documents to the answer to the user prompt; determining that the measure of relevancy exceeds a threshold relevancy value; and based on the measure of relevancy exceeding the threshold relevancy value, determining that the user is not permitted to view the answer and preventing a presentation of the answer to the user. The features of storing, in the vector store, documents from specified data sources exclusively and determining that the user is not permitted to view the answer based on the measure of relevancy exceeding the threshold relevancy value provides a specific technical effect of providing a direct and quick evaluation of whether the generated model response aligns with the document (which is known to include information from a specified data source) by utilizing methods such as LM based estimation or perplexity measures, where the storage of documents in the vector store is simplified to include only documents that are from specified data sources. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

As used herein, a specified data source is defined as a repository storing information whose access is restricted to one or more authorized parties. In one embodiment, information in a specified data source can include confidential information (e.g., personally identifiable information), confidential business information (e.g., trade secrets, sales and marketing plans, new product plans, financial data, customer and supplier information, and descriptions of patentable inventions), classified information (e.g., information subject to special security classification regulations imposed by a national government), sensitive information, or any other specific information whose access is restricted. Information in a specified data source does not include public information (e.g., public records available on the Internet). In one embodiment, a specified data source is a sensitive data source.

In embodiments, the aforementioned operation of storing the data in the vector store includes storing in the vector store documents from specified data sources exclusively, where one or more other data sources included in the multiple data sources on which the LM is trained are open data sources that are not specified data sources, and the aforementioned operation of determining whether to present the answer to the user includes: determining a measure of relevancy of the retrieved documents to the answer to the user prompt; determining that the measure of relevancy does not exceed a threshold relevancy value; and based on the measure of relevancy not exceeding the threshold relevancy value, determining that the user is permitted to view the answer and presenting the answer to the user. The features of storing documents from specified data sources exclusively and determining that the user is permitted to view the answer based on the measure of relevancy not exceeding the threshold relevancy value provides a specific technical effect of making a quick and direct evaluation that the generated answer is not aligned with the retrieved document (which is known to originate from a specified data source), thereby allowing a speedy determination that the user is permitted to view the answer. The operations discussed in this paragraph are also performed by the processor set in the aforementioned computer system and by the program instructions in the aforementioned computer program product. The specific technical effect discussed in this paragraph is also a specific technical effect provided by each of the aforementioned computer system and the computer program product.

A particular application of an embodiment of the present invention can include using the computer-implemented method described above to address access control of answers to user prompts, where the answers are generated based on an organization's documents which are in multiple categories. Two of these categories are financial documents and artificial intelligence (AI) research documents. A user prompt asks a question about AI research and its financial consequences. The model retrieves some relevant documents in the finance category and other relevant documents in the AI research category. The model generates an answer to the user prompt, where the answer is based on the retrieved financial and AI research documents. The user who provided the user prompt has a privilege to access financial documents but does not have a privilege that grants the user access to AI research documents. Because the user lacks the required privilege for the AI research documents, the access control system does not present the answer to the user and may present a notification to the user explaining that the user is not allowed to view the answer because the user lacks the privilege to access at least some of the documents that were used to generate the answer. Alternatively, the access control system presents to the user a partial answer to the user prompt, where the partial answer is based on the financial documents, but not on the AI research documents. Controlling the user's access to the answer or providing only the partial answer to the user based the user's privilege to access financial documents, but not AI research documents, provides user-specific model responses based on a user's privilege, even though the model has been trained on a set of data sources that have a variety of access requirements.

A common scenario includes fine-tuning a language model using diverse data sources. Users have varying access rights or privileges to access these data sources. A conventional approach to restrict or control access to the different knowledge bases used to train a foundation model includes training models for each knowledge base. The training of foundation models is highly expensive and a time-consuming process. Furthermore, a conventional approach that forces a particular model to generate an answer based only on retrieved data does not prevent leakage of data that the model memorized during training. Still further, known work in the field of foundation models addresses only a narrow scope of safety issues related to LMs, such as bias, Hate Abuse Profanity (HAP), and adversarial attacks.

Embodiments of the present invention address the aforementioned unique challenges by training an LM on diverse data sources while adding an access control mechanism for mitigating the risk that the LM exposes enterprise information from specified data sources (e.g., sensitive enterprise information) to users who lack the appropriate privileges to access the information. As used herein, a LM is defined as a probabilistic model of a natural language that can be used for a variety of tasks, including natural language generation whereby a response is generated to answer a user query. A LM can acquire the natural language generation abilities by, for example, learning statistical relationships from large amounts of text during a self-supervised and semi-supervised training process. As used herein, a LM can be a large language model or a small language model. Hereinafter, the LM is also referred to simply as the model. As used herein, a privilege is a specific permission granted to a user that allows the user to access certain documents and perform certain actions on the accessed documents.

Embodiments of the present invention provide a retrieval-based method for implementing access control on the internal knowledge of a LM, thereby allowing the LM to provide user-specific responses based on individual privileges and access rights, even though the LM has been trained on a set of data sources having diverse privileges. For example, the LM is fine-tuned with diverse data sources, while users have varying levels of access to the data sources. As used herein, an access right is a specific permission granted to a user that allows the user to perform particular actions on a document, such as reading, modifying, deleting, or commenting on the document.

In one embodiment, the access control system disclosed herein stores data (or samples of data) from different data sources within a vector store. Each data segment in the vector store is tagged to indicate the particular data source from which the data segment originated. During inference, the access control system uses a model to generate an answer to a user prompt and applies a process of retrieving documents from the vector store using (i) a semantic search for relevant documents in the vector store and (ii) the user prompt, the model's answer, or both the user prompt and the model's answer. Based on the retrieved documents, access requirements associated with the retrieved documents, and user privileges of the user who provided the user prompt, the access control system determines whether the user has a privilege that allows access to the retrieved documents. If the user has the aforementioned privilege allowing access to the retrieved documents, then the access control system decides to present the model's answer to the user. If the user does not have the aforementioned privilege allowing access to the retrieved documents, then the access control system decides to prevent a presentation of the model's answer to the user. As used herein, "answer" refers to an answer to a user prompt and is synonymous with "response."

Alternatively, the access control system receives the user prompt and retrieves the relevant documents from the vector store using the user prompt, without using a model's answer and without initially deciding to generate any model's answer. Based on the retrieved documents, the access requirements associated with the retrieved documents, and the user privileges, the access control system decides whether to generate the model's answer to the user prompt. If the access control system determines the user has a privilege allowing access to the retrieved documents, then the access control system generates the model's answer and allows the user to view the model's answer. If the access control system determines the user does not have a privilege allowing access to the retrieved documents, then the access control system decides not to generate a model's answer to the user prompt.

In one embodiment, the access control system is applied even if the model has already been fine-tuned.

Embodiments of the present invention address an additional domain of safety of LMs, which broadens the aforementioned narrow scope of safety issues. The additional domain of safety includes a method disclosed herein for managing cybersecurity access management directly from within the foundation model.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for controlling access to internal knowledge in a language model, in accordance with embodiments of the present invention. Computing environment 100 contains an example of an environment for the execution of at least some of the computer code involved in performing the inventive methods, such as code 200 for controlling access to internal knowledge in a language model. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
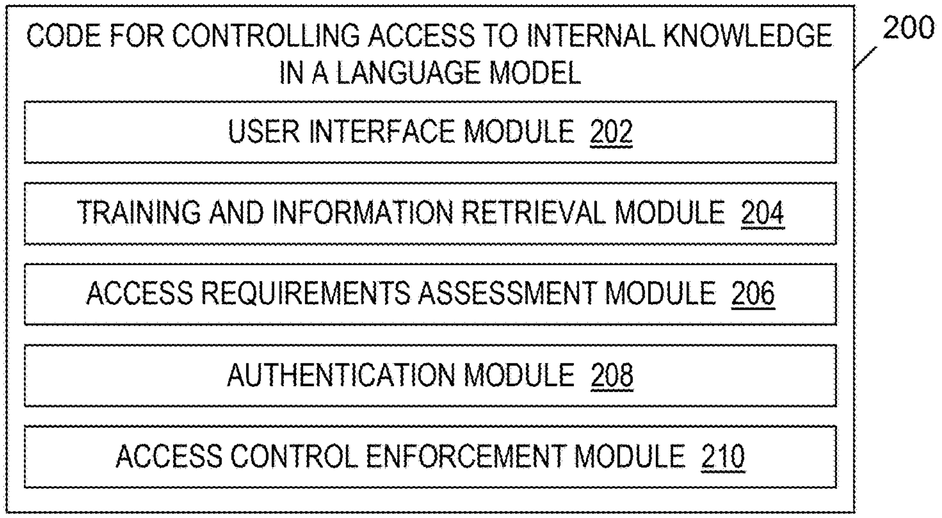
FIG. 2 is a block diagram of modules included in code included in the system of FIG. 1, in accordance with embodiments of the present invention.

System and Process for Controlling Access to Internal Knowledge in a Language Model FIG. 2 is a block diagram of modules included in code 200 included in the system of FIG. 1, in accordance with embodiments of the present invention. Code 200 includes a user interface module 202, a training and information retrieval module 204, an access requirements assessment module 206, an authentication module 208, and an access control enforcement module 210.

User interface module 202 is configured to provide a user interface by which a user inputs a user prompt and receives a response from an LM, where the response is an answer to the user prompt. User interface module 202 is further configured to collect user credentials for authentication. A user utilizes a computing device to interact with the user interface provided by user interface module 202 to submit user prompts and view responses from the LM. User interface module 202 is further configured to ensure that the necessary access rights of users interacting with the aforementioned user interface are collected.

Training and information retrieval module 204 is configured to train the LM on a diverse set of data sources having various privilege levels (i.e., access requirements), and to use the LM to generate a response to a user prompt. The generated response is also referred to herein as a model response.

Access requirements assessment module 206 is configured to perform an access requirements assessment process that evaluates the access requirements for a given model response, and outputs an access requirements token which specifies access requirements for accessing a model response. In one embodiment, the access requirements token includes role(s) and/or permission(s) needed to access a model response. As used herein, a role is a predefined category that is assigned to a user based on the user's job title or job function within an organization. As used herein, a permission is a specific right or privilege granted to a user which allows the user to access particular documents and perform specific actions on those documents. The access requirements assessment process is described in detail in the discussion of FIG. 5, which is presented below.

Authentication module 208 is configured to use a domain control server (also referred to herein as an authentication server) to authenticate a user and determine the user's privileges based on user credentials (i.e., the credentials of the user). Authentication module 208 is further configured to use the domain control server to verify the user credentials and generate a user privilege token, which encapsulates the user's role(s) and/or permission(s). The input to the domain control server includes user credentials, such as a username and password. The output from the domain control server includes a user privilege token which includes the user's role(s) and permission(s).

Access control enforcement module 210 (also referred to herein as policy enforcement point (PEP)) is configured to enforce access control policies based on the user's privileges and the access requirements of the model response. Access control enforcement module 210 receives two inputs: (i) the user privilege token generated by authentication module 208 and (ii) the access requirements token outputted from the access requirements assessment module 206, where the access requirements token specifies the role(s) and/or permission(s) needed to access the model response. Access control enforcement module 210 is further configured to evaluate whether the user meets the necessary privileges (i.e., whether the user's role(s) and/or permission(s) specified in the user privilege token match or are included in the role(s) and/or permission(s) in the access requirements token).

The functionality of the modules included in code 200 is described in more detail in the discussions presented below relative to FIG. 3, FIG. 4, and FIG. 5.

Figure 3:
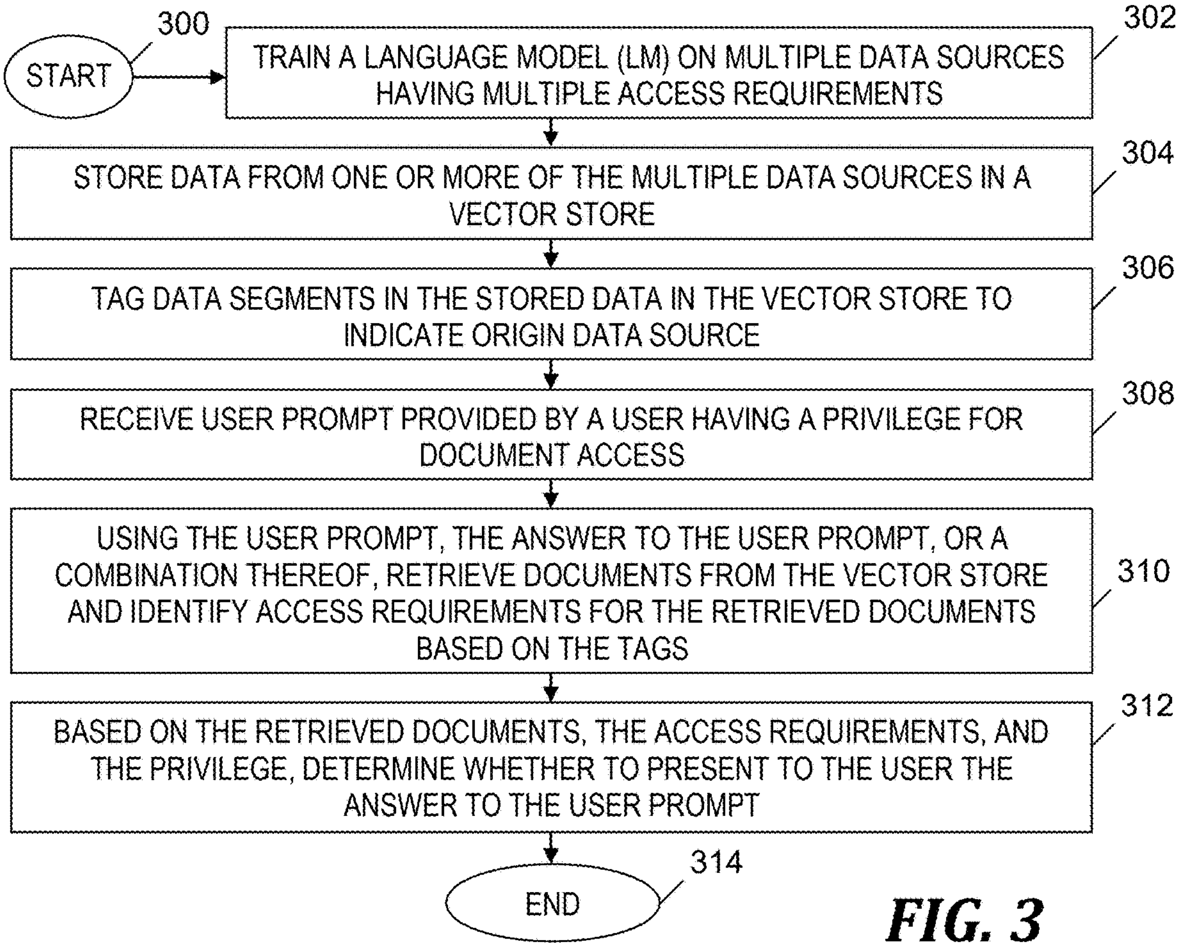
FIG. 3 is a flowchart of a process of controlling access to internal knowledge in a language model, where operations of the flowchart are performed by modules in FIG. 2, in accordance with embodiments of the present invention.

FIG. 3 is a flowchart of a process of controlling access to internal knowledge in a language model, where operations of the flowchart are performed by modules in FIG. 2, in accordance with embodiments of the present invention. The process of FIG. 3 is included in a retrieval-based method to implement an access control mechanism that enables the model to deliver user-specific responses based on individual privileges (i.e., document access privileges of users) and access rights, despite the model being trained on a comprehensive set of data sources having a variety of access requirements. The process of FIG. 3 begins at a start node 300. In step 302, training and information retrieval module 204 trains a LM on multiple data sources having multiple access requirements.

In step 304, training and information retrieval module 204 stores data from one or more of the multiple data sources in a vector store.

In step 306, training and information retrieval module 204 tags data segments in the data stored in step 304, where the tagging indicates from which data source a given data segment originates (i.e., indicates an origin data source of a given data segment).

In step 308, user interface module 202 receives a user prompt provided by a user who has a document access privilege (also referred to herein simply as a privilege). A document access privilege of a user is specified by a permission or a role of the user and indicates that the user is permitted to access a document whose access requirements match or include the permission or role of the user. The privilege of the user is determined by authentication module 208. In one embodiment, the LM determines an answer (also referred to herein as a response) to the user prompt after step 308 and prior to step 310.

In step 310, access requirements assessment module 206 retrieves documents from the vector store and identifies access requirements for the retrieved documents based on the tags on the data segments which result from the tagging in step 306. The retrieval of the documents in step 310 is performed by using (i) the user prompt received in step 308 (without using the answer to the user prompt), (ii) the answer to the user prompt (without using the user prompt), or (iii) both the user prompt and the answer to the user prompt.

In step 312, based on the documents retrieved in step 310, the access requirements identified in step 310, and the privilege of the user determined by authentication module 208, access control enforcement module 210 determines whether the user is permitted to view the answer to the user prompt generated by the LM and whether to present to the user the answer to the user prompt.

Following step 312, the process of FIG. 3 ends at an end node 314.

In one embodiment, step 304 includes storing in the vector store (i) pre-training data known by the LM without any fine-tuning data, (ii) fine-tuning data known by the LM without any pre-training data, or (iii) both the pre-training data and the fine-tuning data known by the LM (or representative samples of the aforementioned data in (i), (ii) or (iii)). The LM generates the answer to the user prompt based on the aforementioned data in (i), (ii), or (iii) stored in the vector store (or based on the representative samples of the aforementioned data). As used herein, unless otherwise qualified with a modifier, "pre-training data" means all or a representative sample of the pre-training data known to the LM. Similarly, as used herein, unless otherwise qualified with a modifier, "fine-tuning data" means all or a representative sample of the fine-tuning data known to the LM. Continuing the embodiment described in this paragraph, identifying the access requirements in step 310 includes identifying a most restrictive access requirement of any document included in the documents retrieved in step 310. The most restrictive access requirement of a given document in the retrieved documents has a level of restrictiveness that equals or exceeds a restrictiveness of any other access requirement of any other document in the retrieved documents. Determining whether to present to the user the answer to the user prompt in step 312 is further based on the most restrictive access requirement.

In one embodiment, 304 includes storing in the vector store documents from specified data sources exclusively. One or more other data sources included in the multiple data sources on which the LM is trained in step 302 are open data sources (e.g., public data sources) that are not specified data sources. Determining whether to present to the user the answer to the user prompt in step 312 includes (i) determining a measure of relevancy of the documents retrieved in step 310; (ii) determining that the measure of relevancy exceeds or does not exceed a threshold relevancy value; and (iii) based on the measure of relevancy exceeding the threshold relevancy value, determining that the user is not permitted to view the answer and preventing a presentation of the answer to the user, or based on the measure of relevancy not exceeding the threshold relevancy value, determining that the user is permitted to view the answer and presenting the answer to the user.

In one embodiment, step 312 includes determining that the privilege does not satisfy the access requirements for the documents retrieved in step 310 and, based on the privilege not satisfying the access requirements, preventing a presentation to the user of the answer to the user prompt. In another embodiment, step 312 includes determining that the privilege satisfies the access requirements for the documents retrieved in step 310 and, based on the privilege satisfying the access requirements, presenting to the user the answer to the user prompt. In alternative embodiments described below, the process of FIG. 3 can be modified to include an optional iterative process.

In an alternative embodiment, step 312 includes (1) determining that the privilege does not satisfy the access requirements for the documents retrieved in step 310; and (2) in response to determining that the privilege does not satisfy the access requirements for the retrieved documents, designating the answer as invalid and initiating the aforementioned optional iterative process that includes: (i) providing the LM with the user prompt enriched by one or more prior invalid answers and one or more corresponding descriptions of issues associated with the one or more prior invalid answers; (ii) generating, by the LM, a new answer to the user prompt; (iii) determining that the new answer addresses the issues; and (iv) in response to determining that the new answer addresses the issues, presenting the new answer to the user.

In another alternative embodiment, step 312 includes (1) determining that the privilege does not satisfy the access requirements for the documents retrieved in step 310; and (2) in response to determining that the privilege does not satisfy the access requirements for the retrieved documents, designating the answer as invalid and initiating the aforementioned optional iterative process that includes: (i) providing the LM with the user prompt enriched by one or more prior invalid answers and one or more corresponding descriptions of issues associated with the one or more prior invalid answers; (ii) generating, by the LM in a current iteration of the iterative process, a new answer to the user prompt; (iii) determining that the new answer does not address the issues; (iv) determining that a number of iterations in the iterative process up to and including the current iteration equals a maximum iterations limit; and (v) based on the new answer not addressing the issues and the number of iterations equaling the maximum iterations limit, ending the iterative process and sending a default message to the user to notify and explain why the user is not permitted to receive a response to the user prompt.

Figure 4:
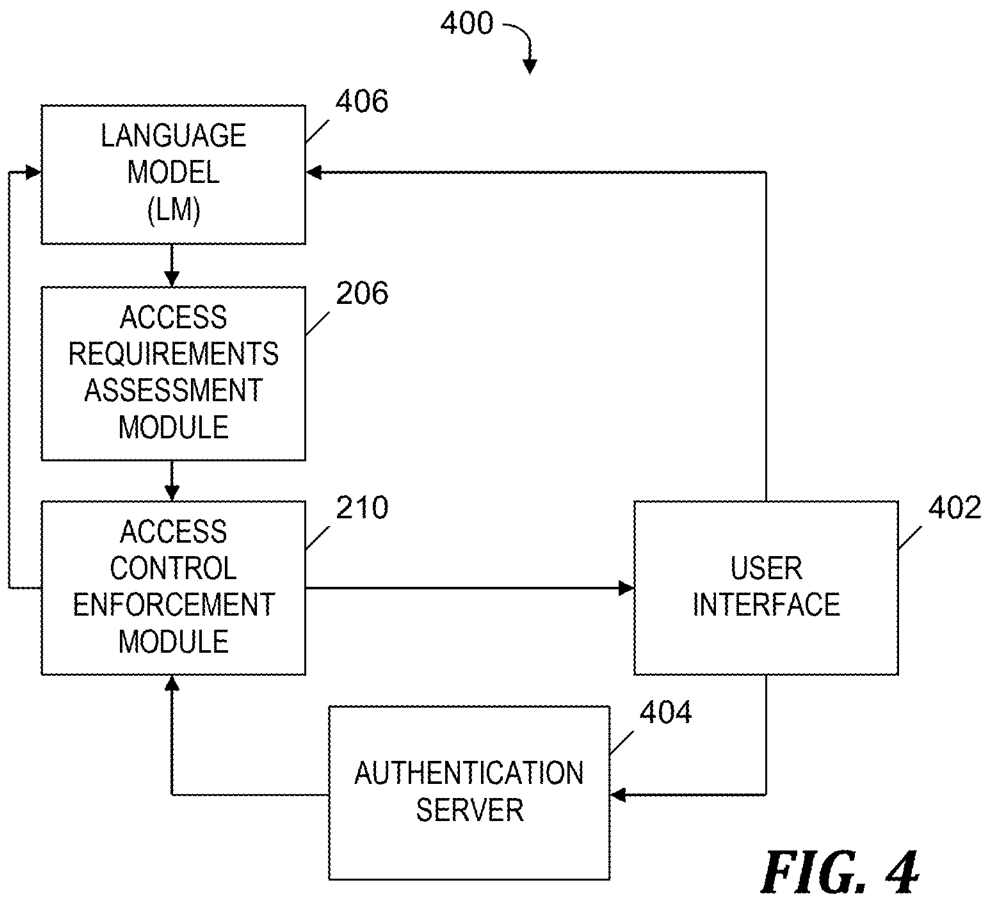
FIG. 4 is a block diagram of an access control system that uses modules in FIG. 2 to perform operations in the process of FIG. 3, in accordance with embodiments of the present invention.

FIG. 4 is a block diagram of an access control system 400 that uses modules in FIG. 2 to perform operations in the process of FIG. 3, in accordance with embodiments of the present invention. Access control system 400 includes a user interface 402, an authentication server 404, a language model (LM) 406, access requirements assessment module 206, and access control enforcement module 210. User interface 404 performs the operations provided by user interface module 202. Authentication server 404 performs the operations provided by authentication module 208, and is also referred to as a domain control server.

Access control system 400 is an end-to-end access control mechanism for a given user-model interaction. As used herein, a user-model interaction is defined as an interaction between the user utilizing user interface 402 and LM 406, where the interaction includes the user prompt provided by the user and the answer to the user prompt generated by LM 406. A user prompt entered via user interface 402 is detected by LM 406, which produces the model response (i.e., answer to the user prompt). The model response, together with the user prompt, is inserted as input to an access requirements assessment process performed by access requirements assessment module 206. The access requirements assessment process generates an access requirements token, which specifies the role(s) and/or permission(s) needed to access the model response. The access requirements token is based on the role(s) and/or permission(s) required to access the data source which is the source of the document(s) stored in the vector store which are used to generate the model response.

User interface 402 sends user credentials to authentication server 404, which generates a user privilege token.

Authentication server 404 feeds (i.e., sends) the user privilege token to access control enforcement module 210. Access requirements assessment module 206 feeds the access requirements token to access control enforcement module 210. Using the user privilege token and the access requirements token, access control enforcement module 210 evaluates whether the user meets the necessary privileges (i.e., resolves the access requirements and user privileges, which determines whether the role(s) and/or permission(s) of the user match or are included in the access requirements for the document(s) that are used to generate the model response). Furthermore, access control enforcement module 210 generates an access decision based on the resolved access requirements and user privileges, where the access decision specifies whether the user is granted or denied access to the model response.

If access to the model response is not granted by access control enforcement module 210, access control enforcement module 210 initiates multiple iterations to generate a response that meets the user's access rights. To perform these iterations, access control enforcement module 210 provides LM 406 with the user prompt, enriched by prior invalid responses (i.e., responses for which user access was denied) and descriptions of the corresponding issues associated with the prior invalid responses. Access control system 400 subsequently tasks LM 406 with generating a new response that addresses the existing issues. If access control enforcement module 210 reaches a predetermined maximum iterations limit and user access is still not granted, then access control enforcement module 210 sends a default message to a computing device utilized by the user to notify and explain why the user cannot receive a response.

In one embodiment, access control system 400 assesses the importance of the user-model interaction based on the user metadata and/or the content of the conversation. Access control system 400 optimizes a trade-off between the profit of the interaction versus the risk of the user having access to data from a specified data source (e.g., sensitive data).

Each component of access control system 400 is described below:

User interface 402: This component is employed by user interface module 202 to allow users to input their user prompts and receive responses from LM 406. User interface 402 collects user credentials for authentication. Users interact with user interface 402 to submit their user prompts and view the model's responses, while user interface module 202 ensures that the necessary access rights are gathered.

Language model 406: A language model trained on a diverse set of data sources with various access requirements.

Access requirements assessment module 206: This module performs an access requirements assessment process that evaluates the access requirements for a given model response. A detailed description of the access requirements assessment process is provided below in the discussion of FIG. 5.

Authentication server 404 (Domain control server): This server authenticates users and determines the users' privileges based on the users' credentials. Authentication server 404 verifies user credentials of a given user and generates a user privilege token, which encapsulates role(s) and/or permission(s) of the given user. The input to authentication server 404 includes user credentials, such as a username and password, and the output includes a user privilege token containing the given user's role(s) and/or permission(s).

Access control enforcement module 210 (Policy Enforcement Point (PEP)): This module enforces access control policies based on the user's privileges and the access requirements of the model response. Access control enforcement module 210 receives two inputs: (i) the user privilege token from authentication server 404 and the access requirements token from access requirements assessment module 206. The access requirements token specifies which role(s) and/or permission(s) are needed to access the model response. Access control enforcement module 210 evaluates whether the user meets the necessary privileges and generates an access decision, which either grants or denies the user access to the model response.

Figure 5:
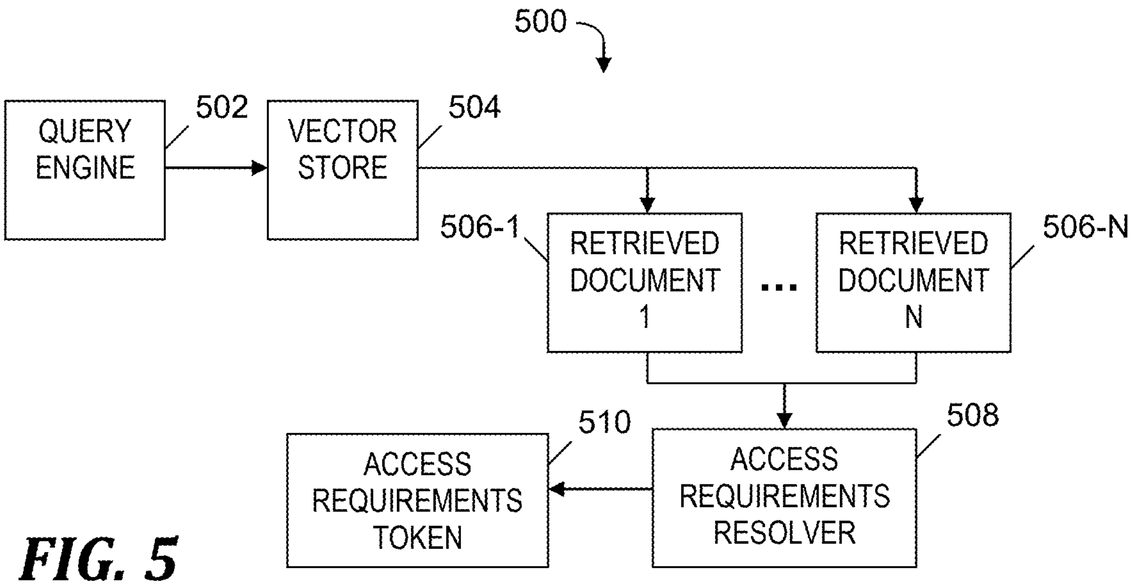
FIG. 5 is a block diagram of an access requirements assessment process performed by the system of FIG. 4, in accordance with embodiments of the present invention.

FIG. 5 is a block diagram of an access requirements assessment process 500 performed by access requirements assessment module 206 in the system of FIG. 4, in accordance with embodiments of the present invention. Access requirements assessment process 500 takes as input the user prompt and the corresponding model response, and returns the access requirements token, which specifies the requirements for accessing the model response.

The flow of access requirements assessment process 500 starts with query engine 502, which receives the user-model interaction and retrieves from vector store 504 a set of N relevant documents, where N is an integer greater than or equal to one. The N relevant documents are retrieved document 506-1, . . . , retrieved document 506-N (i.e., retrieved document 1, . . . , retrieved document N). Query engine 502 feeds retrieved document 506-1, . . . , retrieved document 506-N into access requirements resolver 508 (also known as an access privilege resolver), which assesses the access requirements for the given model response and generates an access requirements token 510.

The components used in access requirements assessment process 500 are described below:

Vector store 504: This component contains data (or samples of data) from various data sources, with each document tagged by its origin data source. Two scenarios are considered relevant to vector store 504:

Scenario 1: Pre-training data (without any fine-tuning data), fine-tuning data (without any pre-training data), or both the pre-training data and the fine-tuning data (or representative samples of the aforementioned data) are stored in vector store 504.

Scenario 2: Only documents from specified data sources (e.g., sensitive data sources) are stored in vector store 504.

The implications of Scenarios 1 and 2 are discussed below relative to access requirements resolver 508.

Query engine 502: This component retrieves documents from vector store 504 using the user prompt (without using the model answer), the model answer (without using the user prompt), or both the user prompt and the model answer. Query engine 502 returns a set of relevant documents, usually bounded by a predefined integer k. In Scenario 1, the returned set of relevant documents is the set that fits the user-model interaction from the pre-training data without the fine-tuning data, the fine-tuning data without the pre-training data, or both the pre-training data and the fine-tuning data, while in Scenario 2, the retrieved documents include only documents from specified data sources (e.g., sensitive data sources). As used herein, a model answer is an answer to a user prompt and means the same as "answer" and "response."

Access requirements resolver 508: This component receives the retrieved documents and user-model interaction and returns the access requirements token 510 (i.e., returns a token that specifies the role(s) and/or permission(s) required to access the model response). In one or more embodiments, access requirements resolver 508 employs one of the strategies that are discussed below:

Retrieval-based resolver: In this strategy, the access requirements are based on the privilege restrictions (i.e., access requirements) of the retrieved documents. In one embodiment, a conservative approach is employed so that the access requirements are the access requirements of the document whose access requirements are the most restrictive (as compared to access requirements of the other documents included in the retrieved documents). The retrieval-based resolver can be applied in Scenario 1, but not in Scenario 2.

Origin document resolver: In this strategy, access requirements resolver 508 assesses and evaluates whether the generated model response aligns with the provided document. This assessment utilizes methods, such as the LM-based estimation and perplexity measures. Integration of a mechanism that emphasizes data from specified data sources allows for refining results by directing a classifier's focus towards this information. Consequently, the classifier determines whether the model response draws from specified data sources.

Enhanced origin document resolver: This strategy is similar to the origin document resolver, but considers documents from various data sources. The enhanced origin document resolver enables a more precise evaluation of the likelihood that the response originated from documents in specified data sources (e.g., sensitive documents) rather than from publicly available documents. In Scenario 2, where only specified data source documents are stored in vector store 504, publicly available data source documents are retrieved through a straightforward web search.

In one embodiment, the access requirements token 510 produced by access requirements resolver 508 include a statistical measure quantifying the probability that the response includes information from a specified data source (e.g., sensitive information). This usage of the statistical measure allows for a more flexible access control mechanism. In one embodiment, if the documents are associated with content sensitivity, then the access requirements token 510 produced by access requirements resolver 508 includes a sensitivity measure quantifying the sensitivity of the relevant document used to create the model response.

The descriptions of the various embodiments of the present invention have been presented herein for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

training a language model (LM) on multiple data sources having multiple access requirements;

storing data from one or more of the multiple data sources in a vector store;

tagging data segments in the stored data in the vector store so that a given data segment indicates a data source from which the given data segment originates;

receiving a user prompt for an information retrieval system that uses the LM to generate answers to user prompts, the user prompt being provided by a user having a privilege for document access;

retrieving documents from the vector store by using the user prompt, an answer to the user prompt, or a combination thereof, and identifying respective access requirements for the retrieved documents based on the tagged data segments; and based on the retrieved documents, the identified access requirements, and the privilege, determining whether to present the answer to the user prompt to the user.

2. The method of claim 1, further comprising:

determining that the privilege satisfies the access requirements for the retrieved documents; and based on the privilege satisfying the access requirements for the retrieved documents, presenting to the user the answer to the user prompt.

3. The method of claim 1, further comprising:

determining that the privilege does not satisfy the access requirements for the retrieved documents; and based on the privilege not satisfying the access requirements for the retrieved documents, preventing a presentation to the user of the answer to the user prompt.

4. The method of claim 3, further comprising:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM, a new answer to the user prompt;

determining that the new answer addresses the issues; and in response to the determining that the new answer addresses the issues, presenting the new answer to the user.

5. The method of claim 3, further comprising:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM in a current iteration of the iterative process, a new answer to the user prompt;

determining that the new answer does not address the issues;

determining that a number of iterations in the iterative process up to and including the current iteration equals a maximum iterations limit; and based on the new answer not addressing the issues and the number of iterations equaling the maximum iterations limit, ending the iterative process and sending a default message to the user to notify and explain why the user is not permitted to receive a response to the user prompt.

6. The method of claim 1, wherein the storing the data in the vector store includes storing in the vector store pre-training data without any fine-tuning data, fine-tuning data without any pre-training data, or both the pre-training data and the fine-tuning data, known by the LM, wherein the answer to the user prompt is generated by the LM based on the pre-training data without any fine-tuning data, the fine-tuning data without any pre-training data, or both the pre-training data and the fine-tuning data stored in the vector store, wherein the identifying the access requirements includes identifying a most restrictive access requirement of a document included in the retrieved documents, wherein the most restrictive access requirement has a level of restrictiveness that equals or exceeds a restrictiveness of any other access requirement of other documents included in the retrieved documents, and wherein the determining whether to present the answer to the user is further based on the most restrictive access requirement.

7. The method of claim 1, wherein the storing the data in the vector store includes storing, in the vector store, documents from specified data sources exclusively, wherein one or more other data sources included in the multiple data sources on which the LM is trained are open data sources that are not specified data sources, and wherein the determining whether to present the answer to the user includes:

determining a measure of relevancy of the retrieved documents to the answer to the user prompt;

determining that the measure of relevancy exceeds a threshold relevancy value; and based on the measure of relevancy exceeding the threshold relevancy value, determining that the user is not permitted to view the answer and preventing a presentation of the answer to the user.

8. The method of claim 1, wherein the storing the data in the vector store includes storing in the vector store documents from specified data sources exclusively, wherein one or more other data sources included in the multiple data sources on which the LM is trained are open data sources that are not specified data sources, and wherein the determining whether to present the answer to the user includes:

determining a measure of relevancy of the retrieved documents to the answer to the user prompt;

determining that the measure of relevancy does not exceed a threshold relevancy value; and based on the measure of relevancy not exceeding the threshold relevancy value, determining that the user is permitted to view the answer and presenting the answer to the user.

9. A computer system comprising:

a processor set;

one or more computer-readable storage media; and program instructions stored on the one or more computer-readable storage media to cause the processor set to perform operations comprising:

training a language model (LM) on multiple data sources having multiple access requirements;

storing data from one or more of the multiple data sources in a vector store;

tagging data segments in the stored data in the vector store so that a given data segment indicates a data source from which the given data segment originates;

receiving a user prompt for an information retrieval system that uses the LM to generate answers to user prompts, the user prompt being provided by a user having a privilege for document access;

retrieving documents from the vector store by using the user prompt, an answer to the user prompt, or a combination thereof, and identifying respective access requirements for the retrieved documents based on the tagged data segments; and based on the retrieved documents, the identified access requirements, and the privilege, determining whether to present the answer to the user prompt to the user.

10. The computer system of claim 9, wherein the operations further comprise:

determining that the privilege satisfies the access requirements for the retrieved documents; and based on the privilege satisfying the access requirements for the retrieved documents, presenting to the user the answer to the user prompt.

11. The computer system of claim 9, wherein the operations further comprise:

determining that the privilege does not satisfy the access requirements for the retrieved documents; and based on the privilege not satisfying the access requirements for the retrieved documents, preventing a presentation to the user of the answer to the user prompt.

12. The computer system of claim 11, wherein the operations further comprise:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM, a new answer to the user prompt;

determining that the new answer addresses the issues; and in response to the determining that the new answer addresses the issues, presenting the new answer to the user.

13. The computer system of claim 11, wherein the operations further comprise:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM in a current iteration of the iterative process, a new answer to the user prompt;

determining that the new answer does not address the issues;

determining that a number of iterations in the iterative process up to and including the current iteration equals a maximum iterations limit; and based on the new answer not addressing the issues and the number of iterations equaling the maximum iterations limit, ending the iterative process and sending a default message to the user to notify and explain why the user is not permitted to receive a response to the user prompt.

14. The computer system of claim 9, wherein the storing the data in the vector store includes storing in the vector store pre-training data without any fine-tuning data, fine-tuning data without any pre-training data, or both the pre-training data and the fine-tuning data, known by the LM, wherein the answer to the user prompt is generated by the LM based on the pre-training data without any fine-tuning data, the fine-tuning data without any pre-training data, or both the pre-training data and the fine-tuning data stored in the vector store, wherein the identifying the access requirements includes identifying a most restrictive access requirement of a document included in the retrieved documents, wherein the most restrictive access requirement has a level of restrictiveness that equals or exceeds a restrictiveness of any other access requirement of other documents included in the retrieved documents, and wherein the determining whether to present the answer to the user is further based on the most restrictive access requirement.

15. The computer system of claim 9, wherein the storing the data in the vector store includes storing, in the vector store, documents from specified data sources exclusively, wherein one or more other data sources included in the multiple data sources on which the LM is trained are open data sources that are not specified data sources, and wherein the determining whether to present the answer to the user includes:

determining a measure of relevancy of the retrieved documents to the answer to the user prompt;

determining that the measure of relevancy exceeds a threshold relevancy value; and based on the measure of relevancy exceeding the threshold relevancy value, determining that the user is not permitted to view the answer and preventing a presentation of the answer to the user.

16. A computer program product comprising:

one or more computer-readable storage media; and program instructions stored on the one or more computer-readable storage media to perform operations comprising:

training a language model (LM) on multiple data sources having multiple access requirements;

storing data from one or more of the multiple data sources in a vector store;

tagging data segments in the stored data in the vector store so that a given data segment indicates a data source from which the given data segment originates;

receiving a user prompt for an information retrieval system that uses the LM to generate answers to user prompts, the user prompt being provided by a user having a privilege for document access;

retrieving documents from the vector store by using the user prompt, an answer to the user prompt, or a combination thereof, and identifying respective access requirements for the retrieved documents based on the tagged data segments; and based on the retrieved documents, the identified access requirements, and the privilege, determining whether to present the answer to the user prompt to the user.

17. The computer program product of claim 16, wherein the operations further comprise:

determining that the privilege satisfies the access requirements for the retrieved documents; and based on the privilege satisfying the access requirements for the retrieved documents, presenting to the user the answer to the user prompt.

18. The computer program product of claim 16, wherein the operations further comprise:

determining that the privilege does not satisfy the access requirements for the retrieved documents; and based on the privilege not satisfying the access requirements for the retrieved documents, preventing a presentation to the user of the answer to the user prompt.

19. The computer program product of claim 18, wherein the operations further comprise:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM, a new answer to the user prompt;

determining that the new answer addresses the issues; and in response to the determining that the new answer addresses the issues, presenting the new answer to the user.

20. The computer program product of claim 18, wherein the operations further comprise:

in response to the determining that the privilege does not satisfy the access requirements for the retrieved documents, designating the answer as invalid and initiating an iterative process that includes:

providing the LM with the user prompt enriched by one or more prior invalid answers and one or more corresponding descriptions of issues associated with the one or more prior invalid answers;

generating, by the LM in a current iteration of the iterative process, a new answer to the user prompt;

determining that the new answer does not address the issues;

determining that a number of iterations in the iterative process up to and including the current iteration equals a maximum iterations limit; and based on the new answer not addressing the issues and the number of iterations equaling the maximum iterations limit, ending the iterative process and sending a default message to the user to notify and explain why the user is not permitted to receive a response to the user prompt.

* * * * *